(12) United States Patent
Hur et al.

(10) Patent No.: US 10,097,001 B2
(45) Date of Patent: Oct. 9, 2018

(54) POWER CONTROL SYSTEM FOR ENERGY STORAGE DEVICES, AND CONTROL DEVICE AND CONTROL METHOD THEREOF

(71) Applicant: Industry-Academic Cooperation Foundation, Yonsei University, Seoul (KR)

(72) Inventors: Kyeon Hur, Seoul (KR); Jaewoong Shim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 261 days.

(21) Appl. No.: 15/052,209

(22) Filed: Feb. 24, 2016

(65) Prior Publication Data

US 2016/0254665 A1    Sep. 1, 2016

(30) Foreign Application Priority Data

Feb. 26, 2015   (KR) .................... 10-2015-0027603

(51) Int. Cl.
| | |
|---|---|
| *H02J 1/00* | (2006.01) |
| *H02J 3/32* | (2006.01) |
| *H02J 3/36* | (2006.01) |
| *H02J 3/38* | (2006.01) |

(52) U.S. Cl.
CPC ............. *H02J 3/32* (2013.01); *H02J 3/36* (2013.01); *H02J 3/382* (2013.01); *Y02E 60/60* (2013.01); *Y02E 70/30* (2013.01)

(58) Field of Classification Search
CPC ...... H02J 3/382; H02J 3/32; H02J 3/36; Y02E 70/30
See application file for complete search history.

(56) References Cited

U.S. PATENT DOCUMENTS

| | | | | |
|---|---|---|---|---|
| 7,839,023 | B2 * | 11/2010 | Jacobson ............... | H02M 1/42 307/77 |
| 8,723,365 | B2 * | 5/2014 | Bordry ................... | H02J 7/345 307/77 |
| 2008/0150285 | A1 * | 6/2008 | Corcelles Pereira . | H02J 3/1807 290/44 |
| 2011/0278933 | A1 * | 11/2011 | Anderson ............... | H02J 9/04 307/66 |

(Continued)

*Primary Examiner* — Alfonso Perez Borroto
*Assistant Examiner* — Esayas Yeshaw
(74) *Attorney, Agent, or Firm* — Paratus Law Group, PLLC (57) ABSTRACT

Disclosed is a power control system for a plurality of energy storage devices, including: a first converter configured to perform a voltage conversion, the first converter having one end connected to a first power system and another end connected to a direct current (DC) linker; a second converter configured to perform a voltage conversion, the second converter having one end connected to a second power system and another end connected to the DC linker; a first energy storage device configured to store electric energy; a direct current-to-direct current (DC-DC) converter configured to perform a voltage conversion, the DC-DC converter having one end connected to the first energy storage device and another end connected to the DC linker; a second energy storage device connected to the DC linker and configured to store electric energy, and a control device.

12 Claims, 6 Drawing Sheets

(56) References Cited

U.S. PATENT DOCUMENTS

| | | | |
|---|---|---|---|
| 2012/0074786 A1* | 3/2012 | Johnson, Jr. | H02J 9/062 307/66 |
| 2013/0181519 A1* | 7/2013 | Lee | H02J 3/28 307/24 |
| 2013/0249300 A1* | 9/2013 | Fishman | H01L 31/02016 307/82 |
| 2014/0049117 A1* | 2/2014 | Rahman | H02J 4/00 307/82 |
| 2014/0268926 A1* | 9/2014 | Gupta | H02M 5/44 363/35 |
| 2014/0292081 A1* | 10/2014 | Long | H02J 1/102 307/24 |
| 2015/0001932 A1* | 1/2015 | Inoue | G05F 1/67 307/24 |
| 2015/0326014 A1* | 11/2015 | Hasler | H02J 3/382 307/24 |
| 2016/0079881 A1* | 3/2016 | Barbosa | H02M 7/49 307/11 |

* cited by examiner

POWER CONTROL SYSTEM FOR ENERGY STORAGE DEVICES, AND CONTROL DEVICE AND CONTROL METHOD THEREOF

CROSS-REFERENCE TO RELATED APPLICATION

This application claims priority to Korean Patent Application No. 10-2015-0027603 filed on Feb. 26, 2015, the disclosure of which is incorporated herein by reference in its entirety.

BACKGROUND

1. Field

The present disclosure relates to a power control system for a plurality of energy storage devices and a control device and control method thereof, and more particularly, to a power control system and method for controlling the charging and discharging of a plurality of energy storage devices connected to a new renewable energy source, a power system or the like.

2. Discussion of Related Art

In response to a rapid increase in the price of petroleum and natural gas, the power industry is expected to significantly and quickly change in terms of its structure, operation, planning, and regulation. Recently, a smart grid is introduced for power suppliers or system operators and consumers to optimize energy efficiency through a bi-directional exchange of power usage information in real-time by a combination of a power network and a communication network.

In a smart grid, independent management and operation are performed by introducing distributed power that is based on new renewable energy. Also, the inefficiency of conventional power systems may be solved by providing services that are based on intellectualization and several other techniques to respond to the demand of consumers in real-time.

The smart grid has evolved into a power control system including an energy storage device in order to store surplus power when the amount of energy generated is large and supply power when the amount of energy generated is small.

Figure 1:
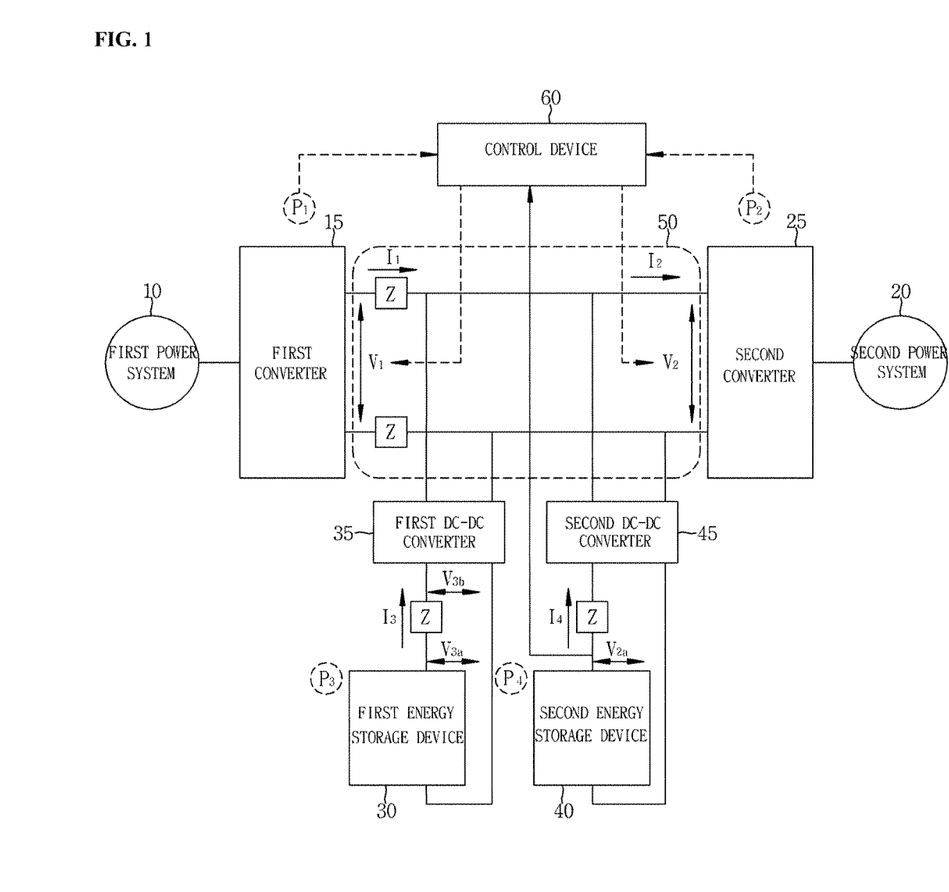
FIG. 1 is a schematic block diagram of a power control system for a plurality of energy storage devices according to the related art.

In association with this, FIG. 1 is a schematic block diagram of a power control system for a plurality of energy storage devices according to the related art. For reference, FIG. 1 shows a structure in which two energy storage devices 30 and 40 are connected between a first power system 10 and a second power system 20.

In the related art, when the energy storage devices are connected, respective direct current-to-direct current (DC-DC) converters are used. The power of the individual energy storage devices is adjusted by adjusting the voltage of each of the DC-DC converters.

Referring to FIG. 1, the first power system 10 is connected with a direct current (DC) linker 50 through a first converter 15, and the second power system 20 is connected with the DC linker 50 through a second converter 25. A control device 60 controls a voltage of the DC linker 50 by controlling a voltage $V_1$ of the first converter 15 on the basis of power $P_1$ of the first converter 15 and by controlling a voltage $V_2$ of the second converter 25 on the basis of power $P_2$ of the second converter 25.

A first energy storage device 30 is connected to the DC linker 50 through a first DC-DC converter 35. Also, a second energy storage device 40 is connected to the DC linker 50 through a second DC-DC converter 45. Here, each of the energy storage devices 30 and 40 has a voltage that is substantially fixed due to its chemical properties. The voltage varies slightly depending on a state of charge (SOC). Therefore, the first DC-DC converter 35 controls a low-voltage side DC voltage $V_{3b}$ to maintain a voltage $V_{3a}$ which the first energy storage device 30 requires, and the second DC-DC converter 45 likewise controls a low-voltage side DC voltage $V_{4b}$ to maintain a voltage $V_{4a}$ which the second energy storage device 40 requires.

As described above, power control is performed using respective DC-DC converters of the energy storage devices, and thus a number of DC-DC converters equal to the number of energy storage devices are needed. Whenever one DC-DC converter is additionally installed, the cost increases, and the efficiency decreases due to power loss. Accordingly, a solution is required to reduce the number of DC-DC converters to decrease the cost and increase the efficiency.

SUMMARY

The present disclosure is directed to a power control system for a plurality of energy storage devices which efficiently performs control by reducing the number of direct current-to-direct current (DC-DC) converters when the plurality of energy storage devices are connected to a new renewable energy source or a power system, and a control device and control method thereof.

The present disclosure is also directed to a power control system for a plurality of energy storage devices which efficiently controls the charging and discharging of a hybrid energy storage device including a single DC-DC converter, and a control device and control method thereof.

According to an aspect of the present disclosure, there is provided a power control system for a plurality of energy storage devices including a first converter configured to perform a voltage conversion, the first converter having one end connected to a first power system and another end connected to a DC linker; a second converter configured to perform a voltage conversion, the second converter having one end connected to a second power system and another end connected to the DC linker; a first energy storage device configured to store electric energy; a DC-DC converter configured to perform a voltage conversion, the DC-DC converter having one end connected to the first energy storage device and another end connected to the DC linker; a second energy storage device connected to the DC linker and configured to store electric energy, and a control device configured to control a voltage of the first converter and a voltage of the second converter based on a voltage of the second energy storage device.

According to another aspect of the present disclosure, there is provided a power control system for a plurality of energy storage devices including a first converter configured to perform a voltage conversion, the first converter having one end connected to a new renewable energy source and another end connected to a DC linker; a second converter configured to perform a voltage conversion, the second converter having one end connected to a power system and another end connected to the DC linker; a first energy storage device configured to store electric energy; a DC-DC converter configured to perform a voltage conversion, the DC-DC converter having one end connected to the first energy storage device and another end connected to the DC linker; a second energy storage device connected to the DC linker and configured to store electric energy, and a control device configured to control a voltage of the first converter and a voltage of the second converter based on a voltage of the second energy storage device.

According to still another aspect of the present disclosure, there is provided a power control system for a plurality of energy storage devices including a first converter configured to perform a voltage conversion, the first converter having one end connected to a first power system or a new renewable energy source and another end connected to a DC linker; a second converter configured to perform a voltage conversion, the second converter having one end connected to a power system and another end connected to the DC linker; a first energy storage device configured to store electric energy; a DC-DC converter configured to perform a voltage conversion, the DC-DC converter having one end connected to the first energy storage device and another end connected to the DC linker; and a second energy storage device connected to the DC linker and configured to store electric energy. Separately, a control device is configured to control a voltage of the first converter and a voltage of the second converter based on a voltage of the second energy storage device.

According to yet another aspect of the present disclosure, there is provided a control method of a power control system for a plurality of energy storage devices including setting a reference voltage of a second energy storage device; setting a voltage of another end of a second converter based on the set reference voltage of the second energy storage device; and setting a voltage of another end of a first converter based on the set voltage of the other end of the second converter.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure or characteristic described herein in connection with one embodiment may be implemented within other embodiments without departing from the spirit and scope of the present disclosure. In addition, it is to be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar elements throughout the several views.

Hereinafter, embodiments of the present disclosure will be described in more detail with reference to the accompanying drawings. For reference, detailed descriptions related to well-known functions or elements will be ruled out in order to not unnecessarily obscure subject matters of the present disclosure.

Figure 2:
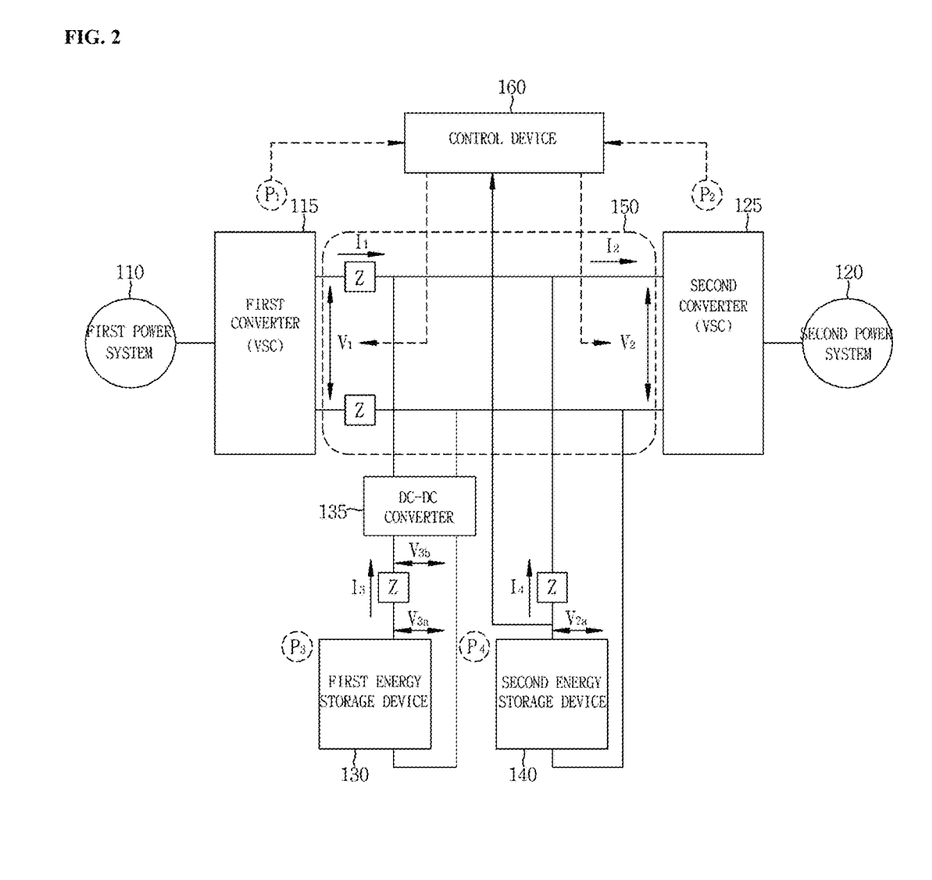
FIG. 2 is a schematic block diagram of a power control system for a plurality of energy storage devices according to a first embodiment of the present disclosure.

FIG. 2 is a schematic block diagram of a power control system for a plurality of energy storage devices according to a first embodiment of the present disclosure. For reference, FIG. 2 shows a structure in which two energy storage devices 130 and 140 are connected between a first power system 110 and a second power system 120. Here, the first power system 110 may be replaced with a new renewable energy source. A wind turbine power source, a photovoltaic source, a solar heat source, or a fuel cell may be used as the new renewable energy source.

In this disclosure, when a plurality of energy storage devices are connected, at least one is connected without a direct current-to-direct current (DC-DC) converter, and the other energy storage devices are connected through respective DC-DC converters.

Referring to FIG. 2, the first power system 110 is connected with a DC linker 150 through a first converter 115, and the second power system 120 is connected with the DC linker 150 through a second converter 125. Accordingly, the first converter 115 has one end connected to the first power system 110 and another end connected to the DC linker 150, and the second converter 125 has one end connected to the second power system 120 and another end connected to the DC linker 150. Here, a voltage source converter (VSC) may be used as each of the first converter 115 and the second converter 125.

The first and second energy storage devices 130 and 140 are connected to the DC linker 150. In detail, the first energy storage device 130 is connected to the DC linker 150 through the DC-DC converter 135, and the second energy storage device 140 is connected to the DC linker 150 without a DC-DC converter.

As described above, each of the first and second energy storage devices 130 and 140 has a voltage that is substantially fixed due to its chemical properties. The voltage varies slightly depending on a state of charge (SOC). Accordingly, for the first energy storage device 130 with the DC-DC converter 135, the DC-DC converter 135 individually controls a low-voltage side DC voltage $V_{3b}$ to maintain a voltage $V_{3a}$ required by the first energy storage device 130. On the other hand, for the second energy storage device 140 without a DC-DC converter, a control device 160 performs indirect control to maintain a voltage $V_{4a}$ required by the second energy storage device 140.

In detail, the control device 160 controls a voltage $V_2$ of the other end of the second converter 125 connected to the DC linker 150 on the basis of the voltage $V_{4a}$ of the second energy storage device 140. For example, the control device 160 adjusts a current $I_4$ ($=(V_{4a}-V_2)/Z$) in order to control power $P_4$ ($=I_4 \times V_{4a}$) while maintaining the voltage $V_{4a}$ required by the second energy storage device 140. Accordingly, the control device 160 adjusts a current $I_2$ of the second converter 125. The control device 160 adjusts the voltage $V_2$ in order to control power $P_2$ ($=I_2 \times V_2$) while maintaining the current $I_2$ of the second converter 125.

In addition, the control device 160 controls a voltage $V_1$ of the other end of the first converter 115 connected to the DC linker 150 on the basis of the voltage $V_2$ of the other end of the second converter 125. For example, the control device 160 adjusts the voltage $V_1$ of the other end of the first converter 115 in order to control power $P_1$ ($=I_1 \times V_1$) of the first converter 115 while maintaining the voltage $V_2$ of the other end of the second converter 125.

To this end, the control device 160 may include a first controller 162 configured to control the first converter 115 and a second controller 164 configured to control the second converter 125, and may further include a reference marker 166 configured to calculate reference power of the second energy storage device 140 on the basis of a first power $P_1$ and a second power $P_2$ and adjust the voltage $V_2$ of the DC linker 150 on the basis of the reference power and a current SOC.

Figure 3:
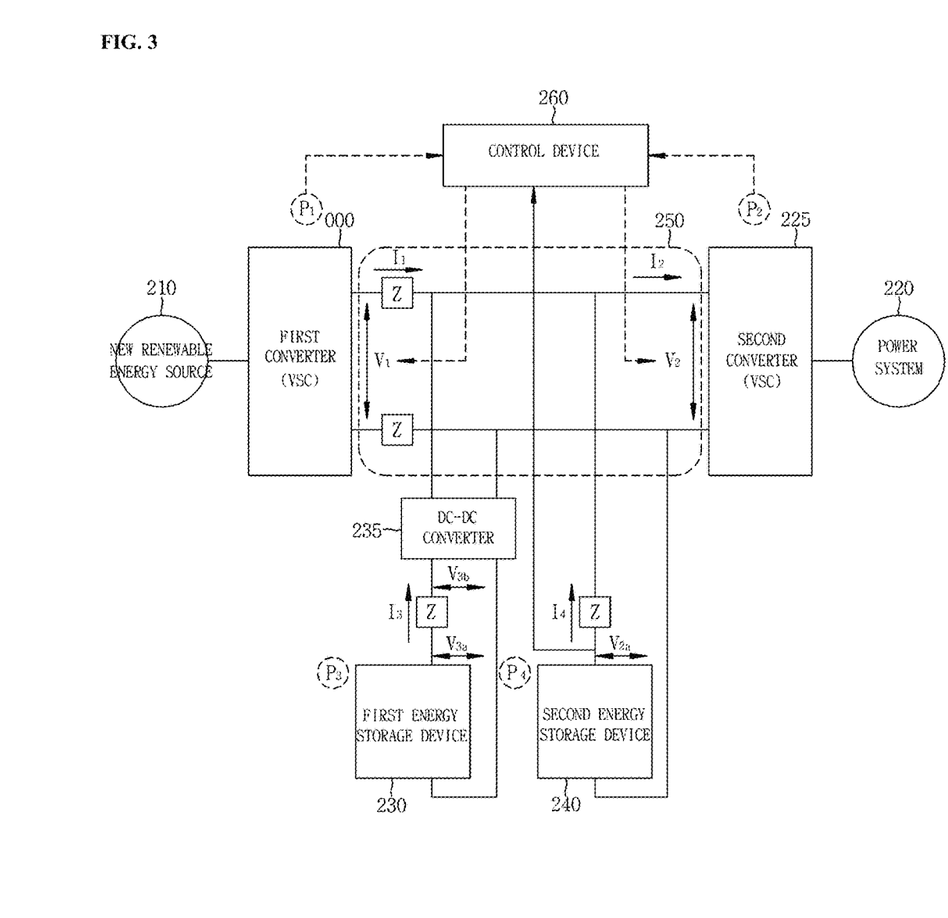
FIG. 3 is a schematic block diagram of a power control system for a plurality of energy storage devices according to a second embodiment of the present disclosure.

FIG. 3 is a schematic block diagram of a power control system for a plurality of energy storage devices according to a second embodiment of the present disclosure. For reference, FIG. 3 shows a structure in which two energy storage devices 230 and 240 are connected between a new renewable energy source 210 that uses wind turbine power generation and a power system 220.

Referring to FIG. 3, the new renewable energy source 210 is connected with a DC linker 250 through a first converter 215, and the power system 220 is connected with the DC linker 250 through a second converter 225. Accordingly, the first converter 215 has one end connected to the new renewable energy source 210 and another end connected to the DC linker 250, and the second converter 225 has one end connected to the power system 220 and another end connected to the DC linker 250. Here, a VSC may be used as each of the first converter 215 and the second converter 225.

The first and second energy storage devices 230 and 240 are connected to the DC linker 250. In detail, the first energy storage device 230 is connected to the DC linker 250 through a DC-DC converter 235, and the second energy storage device 240 is connected to the DC linker 250 without a DC-DC converter.

As described above, each of the first and second energy storage devices 230 and 240 has a voltage that is substantially fixed due to its chemical properties. The voltage varies slightly depending on an SOC. Accordingly, for the first energy storage device 230 with the DC-DC converter 235, the DC-DC converter 235 individually controls a low-voltage side DC voltage $V_{3b}$ to maintain a voltage $V_{3a}$ required by the first energy storage device 230. On the other hand, for the second energy storage device 240 without a DC-DC converter, a control device 260 performs indirect control to maintain a voltage $V_{4a}$ required by the second energy storage device 240.

In detail, the control device 260 controls a voltage $V_2$ of the other end of the second converter 225 connected to the DC linker 250 on the basis of the voltage $V_{4a}$ of the second energy storage device 240. For example, the control device 260 adjusts a current $I_4$ ($=(V_{4a}-V_2)/Z$) in order to control power $P_4$ ($=I_4 \times V_{4a}$) while maintaining the voltage $V_{4a}$ required by the second energy storage device 240. Accordingly, the control device 260 adjusts a current $I_2$ of the second converter 225. The control device 260 adjusts the voltage $V_2$ in order to control power $P_2$ ($=I_2 \times V_2$) while maintaining the current $I_2$ of the second converter 225.

In addition, the control device 260 controls a voltage $V_1$ of the other end of the first converter 215 connected to the DC linker 250 on the basis of the voltage $V_2$ of the other end of the second converter 225. For example, the control device 260 adjusts the voltage $V_1$ of the other end of the first converter 215 in order to control power $P_1$ ($=I_1 \times V_1$) of the first converter 215 while maintaining the voltage $V_2$ of the other end of the second converter 225.

To this end, the control device 260 may include a first controller 262 configured to control the first converter 215 and a second controller 264 configured to control the second converter 225, and may further include a reference marker 266 configured to calculate reference power $P_4$ of the second energy storage device 240 on the basis of a first power $P_1$ and a second power $P_2$ and adjust the voltage $V_2$ of the DC linker 250 on the basis of the reference power $P_4$ and a current SOC.

Figure 4:
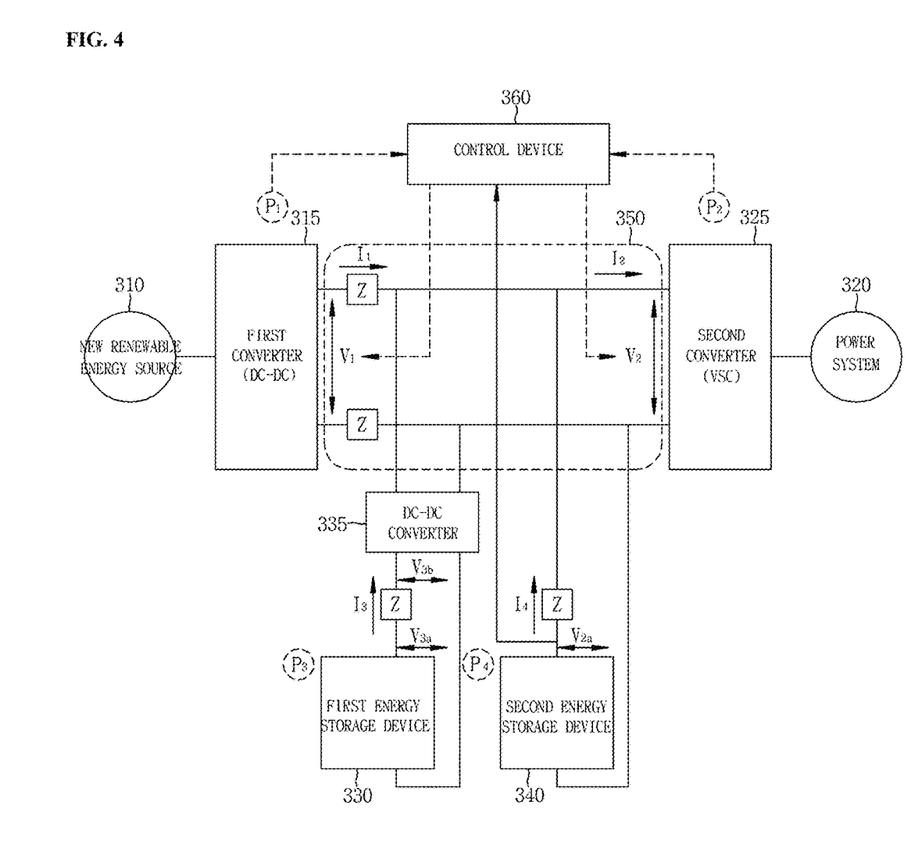
FIG. 4 is a schematic block diagram of a power control system for a plurality of energy storage devices according to a third embodiment of the present disclosure.

FIG. 4 is a schematic block diagram of a power control system for a plurality of energy storage devices according to a third embodiment of the present disclosure. For reference, FIG. 4 shows a structure in which two energy storage devices 330 and 340 are connected between a new renewable energy source 310 that uses photovoltaic power generation and a power system 320.

Referring to FIG. 4, the new renewable energy source 310 is connected with a DC linker 350 through a first converter 315, and the power system 320 is connected with the DC linker 350 through a second converter 325. Accordingly, the first converter 315 has one end connected to the new renewable energy source 310 and another end connected to the DC linker 350, and the second converter 325 has one end connected to the power system 320 and another end connected to the DC linker 350. Here, a DC-DC converter may be used as the first converter 315 and a VSC may be used as the second converter 325.

The first and second energy storage devices 330 and 340 are connected to the DC linker 350. In detail, the first energy storage device 330 is connected to the DC linker 350 through a DC-DC converter 335, and the second energy storage device 340 is connected to the DC linker 350 without a DC-DC converter.

As described above, each of the first and second energy storage devices 330 and 340 has a voltage that is substantially fixed due to its chemical properties. The voltage varies slightly depending on an SOC. Accordingly, for the first energy storage device 330 with the DC-DC converter 335, the DC-DC converter 335 individually controls a low-voltage side DC voltage $V_{3b}$ to maintain a voltage $V_{3a}$ required by the first energy storage device 330. On the other hand, for the second energy storage device 340 without a DC-DC converter, a control device 360 performs indirect control to maintain a voltage $V_{4a}$ required by the second energy storage device 340.

In detail, the control device 360 controls a voltage $V_2$ of the other end of the second converter 325 connected to the DC linker 350 on the basis of the voltage $V_{4a}$ of the second energy storage device 340. For example, the control device 360 adjusts a current $I_4$ ($=(V_{4a}-V_2)/Z$) in order to control power $P_4$ ($=I_4 \times V_{4a}$) while maintaining the voltage $V_{4a}$ required by the second energy storage device 340. Accordingly, the control device 360 adjusts a current $I_2$ of the second converter 325. The control device 360 adjusts the voltage $V_2$ in order to control power $P_2$ ($=I_2 \times V_2$) while maintaining the current $I_2$ of the second converter 325.

In addition, the control device 360 controls a voltage $V_1$ of the other end of the first converter 315 connected to the DC linker 350 on the basis of the voltage $V_2$ of the other end of the second converter 325. For example, the control device 360 adjusts the voltage $V_1$ of the other end of the first converter 315 in order to control power $P_1$ ($=I_1 \times V_1$) of the first converter 315 while maintaining the voltage $V_2$ of the other end of the second converter 325.

To this end, the control device 360 may include a first controller 362 configured to control the first converter 315 and a second controller 364 configured to control the second converter 325, and may further include a reference marker 366 configured to calculate reference power of the second energy storage device 340 on the basis of a first power $P_1$ and a second power $P_2$ and adjust the voltage $V_2$ of the DC linker 350 on the basis of the reference power and a current SOC.

Figure 5:
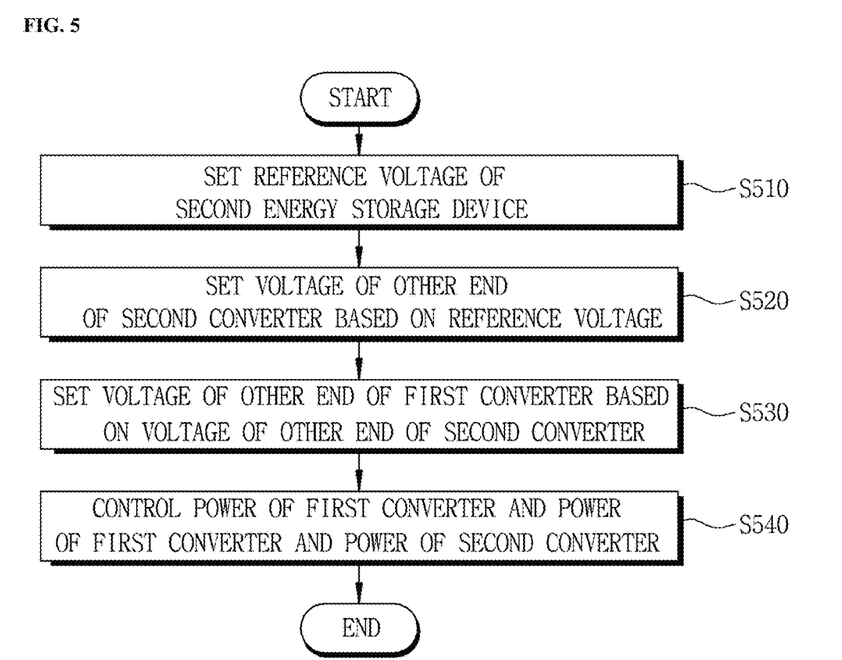
FIG. 5 is a flowchart of a power control method for a plurality of energy storage devices according to an embodiment of the present disclosure.
Figure 6:
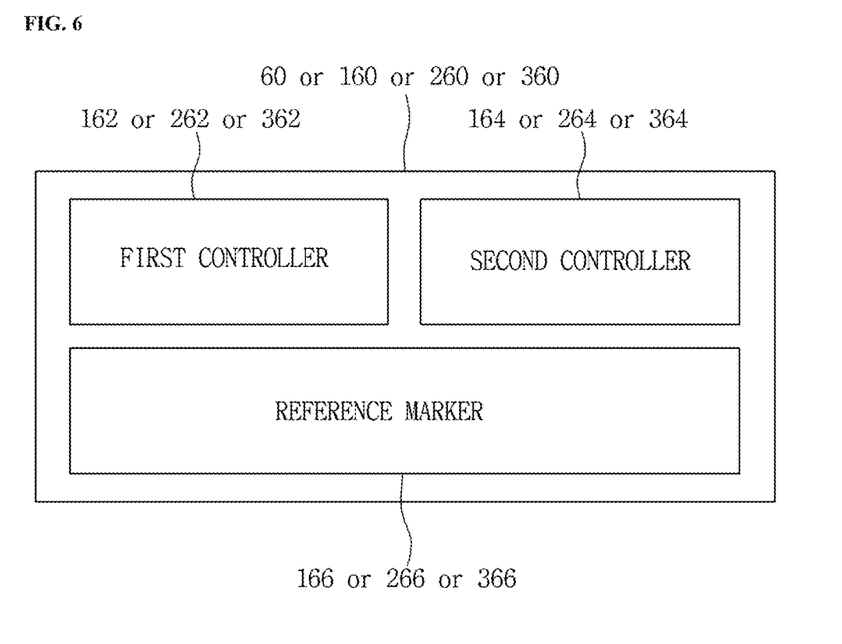
FIG. 6 is a schematic block diagram of a control device for a power control system for a plurality of energy storage devices according to an embodiment of the present disclosure.

FIG. 5 is a flowchart of a power control method for a plurality of energy storage devices according to an embodiment of the present disclosure. For reference, the power control method shown in FIG. 5 is based on and refers to the power control systems shown in FIGS. 2 to 4. Thus, the method will be briefly described below.

Referring to FIG. 5, in S510, a control device sets a reference voltage of a second energy storage device with reference to a voltage of another end of a first converter, a voltage of another end of a second converter, and an SOC of a second energy storage device.

In S520, the control device sets the voltage of the other end of the second converter connected to a DC linker on the basis of the set reference voltage of the second energy storage device.

In S530, the control device sets the voltage of the other end of the first converter connected to the DC linker on the basis of the set voltage of the other end of the second converter.

In S540, the control device controls power of the second converter on the basis of the set voltage of the other end of the second converter and controls power of the first converter on the basis of the set voltage of the other end of the first converter.

According to an embodiment of the present disclosure, one of the first and second energy storage devices may use an energy storage device such as a battery, which has a relatively large capacitance and a relatively low charge and discharge rate, and the other may use an energy storage device such as a super conducting magnetic energy storage (SMES) or a super capacitor (SC), which has a relatively small capacitance and a relatively high charge and discharge rate.

For example, a super capacitor may be used as the first energy storage device 130 connected through the DC-DC converter 135, and a battery may be used as the second energy storage device 140 connected without a DC-DC converter.

This is because the super capacitor has a relatively large variation due to an SOC and the battery has a relatively small variation due to an SOC. Accordingly, it may be advantageous that the super capacitor having a large variation be controlled through the DC-DC converter.

A control device according to an embodiment of the present disclosure may be configured separately from a power control system for a plurality of energy storage devices. Accordingly, the power control system for a plurality of energy storage devices includes a first converter configured to perform a voltage conversion, the first converter having one end connected to a first power system or a new renewable energy source and another end connected to a DC linker; a second converter configured to perform a voltage conversion, the second converter having one end connected to a power system and another end connected to the DC linker; a first energy storage device configured to store electric energy; a DC-DC converter configured to perform a voltage conversion, the DC-DC converter having one end connected to the first energy storage device and another end connected to the DC linker; and a second energy storage device connected to the DC linker and configured to store electric energy. The control device of the power control system may control a voltage of the first converter and a voltage of the second converter based on a voltage of the second energy storage device.

The control device may include a first controller configured to control the first converter and a second controller configured to control the second converter.

The control device may include a reference marker configured to calculate reference power of the second energy storage device based on power of the first converter and power of the second converter and adjust a voltage of the DC linker based on the calculated reference power.

The control device may control a voltage of the other end of the second converter connected to the DC linker based on the voltage of the second energy storage device and may control a voltage of the other end of the first converter connected to the DC linker based on the voltage of the other end of the second converter.

The voltage of the second energy storage device varies depending on an SOC by the control device.

According to the present disclosure, it is possible to decrease the number of DC-DC converters to save an installation cost and reduce power loss by performing power control on one energy storage device without using a DC-DC converter when power control is performed while a plurality of energy storage devices are connected to a new renewable energy source or a power system.

According to the present disclosure, it is also possible to implement a low-cost energy storage device that satisfies a charge and discharge rate and a capacitance at the same time by applying a single DC-DC converter to implement a hybrid energy storage device.

While the present disclosure has been described with reference to exemplary embodiments, it should be understood by those skilled in the art that various changes may be made without departing from the technical spirit or essential characteristics of the present disclosure. Accordingly, the above-described embodiments should be regarded as illustrative rather than restrictive.

Therefore, the scope of the present disclosure is defined not by the detailed description but by the appended claims, and all changes or modifications within the appended claims and their equivalents should be construed as being included in the scope of the present disclosure.

What is claimed is:

1. A control device of a power control system for a plurality of energy storage devices including a first converter configured to perform a voltage conversion, the first converter having one end connected to any one of a first power system and a renewable energy source and another end connected to a direct current (DC) linker; a second converter configured to perform a voltage conversion, the second converter having one end connected to a second power system and another end connected to the DC linker; a first energy storage device configured to store electric energy; a direct current-to-direct current (DC-DC) converter configured to perform a voltage conversion, the DC-DC converter having one end connected to the first energy storage device and another end connected to the DC linker; and a second energy storage device connected to the DC linker and configured to store electric energy, wherein the control device is configured to control a voltage of the first converter and a voltage of the second converter based on a voltage of the second energy storage device, and wherein the control device comprises a reference marker configured to calculate reference power of the second energy storage device based on power of the first converter and power of the second converter and adjust a voltage of the DC linker based on the calculated reference power.

2. The control device of claim 1, wherein the control device comprises a first controller configured to control the first converter and a second controller configured to control the second converter.

3. The control device of claim 1, wherein the control device controls a voltage of the other end of the second converter connected to the DC linker based on the voltage of the second energy storage device and controls a voltage of the other end of the first converter connected to the DC linker based on the voltage of the other end of the second converter.

4. The control device of claim 1, wherein the renewable energy source of the power control system is any one of a wind turbine power source, a photovoltaic source, a solar heat source, and a fuel cell.

5. The control device of claim 1, wherein the voltage of the second energy storage device varies depending on a state of charge (SOC).

6. A power control system for a plurality of energy storage devices, the power control system comprising:
    a first converter configured to perform a voltage conversion, the first converter having one end connected to any one of a first power system and a renewable energy source and another end connected to a direct current (DC) linker;
    a second converter configured to perform a voltage conversion, the second converter having one end connected to a second power system and another end connected to the DC linker;
    a first energy storage device configured to store electric energy;
    a direct current-to-direct current (DC-DC) converter configured to perform a voltage conversion, the DC-DC converter having one end connected to the first energy storage device and another end connected to the DC linker;
    a second energy storage device connected to the DC linker and configured to store electric energy; and
    a control device configured to control a voltage of the first converter and a voltage of the second converter based on a voltage of the second energy storage device,
    wherein the control device comprises a reference marker configured to calculate reference power of the second energy storage device based on power of the first converter and power of the second converter and adjust a voltage of the DC linker based on the calculated reference power.

7. The power control system of claim 6, wherein the control device comprises a first controller configured to control the first converter and a second controller configured to control the second converter.

8. The power control system of claim 6, wherein the control device controls a voltage of the other end of the second converter connected to the DC linker based on the voltage of the second energy storage device and controls a voltage of the other end of the first converter connected to the DC linker based on the voltage of the other end of the second converter.

9. The power control system of claim 6, wherein the renewable energy source of the power control system is any one of a wind turbine power source, a photovoltaic source, a solar heat source, and a fuel cell.

10. The power control system of claim 6, wherein the voltage of the second energy storage device varies depending on a state of charge (SOC).

11. A control method of a power control system for a plurality of energy storage devices including a first converter configured to perform a voltage conversion, the first converter having one end connected to any one of a first power system and a renewable energy source and another end connected to a direct current (DC) linker; a second converter configured to perform a voltage conversion, the second converter having one end connected to a second power system and another end connected to the DC linker; a first energy storage device configured to store electric energy; a direct current-to-direct current (DC-DC) converter configured to perform a voltage conversion, the DC-DC converter having one end connected to the first energy storage device and another end connected to the DC linker; and a second energy storage device connected to the DC linker and configured to store electric energy, the control method comprising:
    setting a reference voltage of the second energy storage device;
    setting a voltage of the other end of the second converter based on the set reference voltage of the second energy storage device;
    setting a voltage of the other end of the first converter based on the set voltage of the other end of the second converter;
    calculating, by a control device of the power control system, reference power of the second energy storage device based on power of the first converter and power of the second converter; and
    adjusting, by the control device, a voltage of the DC linker based on the calculated reference power.

12. The control method of claim 11, wherein the renewable energy source of the power control system is any one of a wind power source, a photovoltaic source, a solar heat source, and a fuel cell.

* * * * *